United States Patent
Kane

(10) Patent No.: US 10,274,378 B1
(45) Date of Patent: Apr. 30, 2019

(54) METHOD AND APPARATUS FOR DETERMINING WAVE CHARACTERISTICS USING CONSTRAINED INTERACTIONS OF WAVES

(71) Applicant: Daniel James Kane, Santa Fe, NM (US)

(72) Inventor: Daniel James Kane, Santa Fe, NM (US)

(73) Assignee: Mesa Photonics, LLC, Santa Fe, NM (US)

( * ) Notice: Subject to any disclaimer, the term of this patent is extended or adjusted under 35 U.S.C. 154(b) by 0 days.

(21) Appl. No.: 15/963,285

(22) Filed: Apr. 26, 2018

(51) Int. Cl.
*G01J 11/00* (2006.01)
*G01J 9/02* (2006.01)

(52) U.S. Cl.
CPC ............... *G01J 11/00* (2013.01); *G01J 9/02* (2013.01); *G01J 2009/0261* (2013.01)

(58) Field of Classification Search
CPC ....................................................... G01J 11/00
See application file for complete search history.

(56) References Cited

U.S. PATENT DOCUMENTS

| | | | |
|---|---|---|---|
| 5,367,375 A | 11/1994 | Siebert | |
| 5,530,544 A | 6/1996 | Trebino | |
| 5,754,292 A | 5/1998 | Kane | |
| 5,936,732 A * | 8/1999 | Smirl | G01J 11/00 356/453 |
| 6,008,899 A | 12/1999 | Trebino et al. | |
| 6,219,142 B1 | 4/2001 | Kane | |
| 6,611,336 B1 * | 8/2003 | Walmsley | G01B 9/02 356/450 |
| 6,633,386 B2 * | 10/2003 | Walmsley | G01J 11/00 356/450 |
| 6,885,442 B1 | 4/2005 | Nugent et al. | |
| 7,039,553 B2 | 5/2006 | Nugent et al. | |
| 7,130,052 B1 | 10/2006 | Kane | |
| 7,493,227 B2 | 2/2009 | Ozcan et al. | |
| 7,630,873 B2 | 12/2009 | Bischoff et al. | |
| 8,068,230 B2 | 11/2011 | Kane | |
| 8,082,117 B2 | 12/2011 | Ozcan et al. | |

(Continued)

OTHER PUBLICATIONS

Daniel W. Griffin and Jae S. Lim, "Signal Estimation from Modified Short-Time Fourier Transform," IEEE Trans. Acoust., Speech, Signal Processing, ASSP-32, 236-243 (1983).

(Continued)

*Primary Examiner* — Jonathan M Hansen

(57) ABSTRACT

A frequency resolved optical gating (FROG) system receives an ultrafast laser pulse as the "unknown wave" input to the system. The FROG system preferably generates a spectrogram (FROG trace) of the input pulse using a polarization gate, second harmonic generation or other FROG geometry. The system or method preferably analyzes the spectrogram using constrained outer products and principal component generalized projections to find characteristics of the unknown wave such as intensity and phase. Examples of constrained outer products include outer products that incorporate an external constraint such as spectral information or an internal constraint such as a relationship between the probe and gate components derived from the unknown wave.

10 Claims, 4 Drawing Sheets

(56) References Cited

U.S. PATENT DOCUMENTS 8,953,166 B2 2/2015 Bowlan et al.
9,423,307 B2 8/2016 Kane

OTHER PUBLICATIONS

C. Dorrer, I. Kang, "Real-Time Implementation of Linear Spectrograms for the Characterization of High Bit-Rate Optical Pulse Trains," IEEE Photon. Technol. Lett., 16, 858-860.
D. J. Kane, et al., "Simultaneous measurement of two ultrashort laser pulses from a single spectrogram in a single shot," J. Opt. Soc. A, 14, 935-943, (1997).
D. J. Kane, "Recent progress toward real-time measurement of ultrashort laser pulses," IEEE J. Quantum Electron., 35, 421-431, (1999).
D. T. Reid, et al., "Amplitude and phase measurement of mid-infrared femtosecond pulses by using cross-correlation frequency-resolved . . . ," Opt. Lett., 25 1478-1480 (2000).
E. B. Treacy, "Measurement and interpretation of dynamic spectrograms of picosecond light pulses," J. Appl. Phys. 42, 3848-3858 (1971).
Chilla and Martinez, "Direct determination of the amplitude and the phase of femtosecond light pulses," Opt. Lett. 16, 39-41 (1991).
R. Trebino, et al., "Measuring ultrashort laser pulses in the time-frequency domain using frequency-resolved optical gating", Rev. Sci Instrum., 68, p. 3277 (1997).
Jiang, Z., et al., "Optical arbitrary waveform characterization using linear spectrograms", Optics Communications, 283, 3017-3021 (2010).
Daniel J. Kane, "Principal components generalized projections: a review [Invited]," J. Opt. Soc. Am. B 25, (2008).
Y. Mairesse, F. Quere, "Frequency-resolved optical gating for complete reconstruction of attosecond bursts," 71, 011401(R) (2005).
D. J. Kane, et al., "Real-time inversion of polarization gate frequency-resolved optical gating spectrograms," Appl. Opt. 42, 1140-1144 (2003).
R. Trebino, et al, "Using phase retrieval to measure the intensity and phase of ultrashort pulses: frequency-resolved optical gating," J. Opt. Soc. Am. A 10, 1101-1111 (1993).
D. J. Kane, "Real-Time Measurement of Ultrashort Laser Pulses Using Principal Component Generalized Projections," IEEE J. Selec. Topics Quant. Elec. 4, 278-284 (1998).
D. J. Kane, "Convergence test for inversion of frequency-resolved optical gating spectrograms," Opt. Lett. 25, 1216-1218 (2000).
K. W. Delong et al., "Pulse retrieval in frequency-resolved optical gating based on the method of generalized projections," Opt. Lett. 19, 2152-2154 (1994).
K. W. Delong et al., "Improved ultrashort pulse-retrieval algorithm for frequency-resolved optical gating", J. Opt. Soc. Am. A 11, 2429-2437 (1994).
C. Dorrer, I. Kang, "Simultaneous temporal characterization of telecommunication optical pulses and modulators by use of spectrograms", Opt. Lett. 27, 1315-1317 (2002).
Gu et al., "Frequency-resolved optical gating and single-shot spectral measurements reveal fine structure in microstructure-fiber continuum", Opt. Lett. 27, 1174-1176 (2002).
X. G. Xu et al., "Complete characterization of molecular vibration using frequency resolved gating," J. Chem. Phys. 126, 091102 (2007).
Daniel J. Kane,"New simplified, algorithm for cross-correlation frequency resolved optical gating," Proc. SPIE 8611, 86110Q (Mar. 15, 2013).
Daniel J. Kane, "Improved principal components generalized projections . . . ," in Conference on Lasers and Electro-Optics, OSA Technical Digest (online)May 14-19, 2017.
Carson Teale, et al.,"Imaging by integrating stitched spectrograms," Optics Express, vol. 21, pp. 6783-6793 (Mar. 23, 2013).
Pavel Sidorenko, et al., "Ptychographic reconstruction algorithm for frequency-resolved optical gating:super-resolution and supreme robustness," Optica, 3,1320-1330 (2016).
Pavel Sidorenko, et al., "Ptychographic reconstruction algorithm for frequency-resolved optical gating:super-resolution and supreme robustness: erratum," Optica 4,1388 (2017).
Birger Seifert, et al., "Nontrivial ambiguities for blind frequency-resolved optical gating and the problem of uniqueness," J. Opt. Soc. Am. B, v21, pp. 1089-1097 (May 2004).
Daniel J. Kane, Rick Trebino, "Charaterization of Arbitrary Femtosecond Pulses Using Frequency-Resolved Optical Gating," IEEE J. Quantum Electron., 29, 571-579, (1993).
C. Dorrer, "Effect of jitter on linear pulse-characterization techniques," Op. Ex., 16, 6567-6578 (2008).
I. Thomann et al.,"Characterizing isolated attosecond pulses from hollow-core waveguides using multi-cycle driving pulses," Op. Ex., 17, 4611-4633 (2009).
T. C. Wong, et al., "Recent Developments in Experimental Techniques for Measuring Two Pulses Simultaneously," Appl. Sci., 3, 299-313 (2013).
K. W. Delong et al., "Frequency-resolved optical gating with the use of second-harmonic generation," J. Opt. Soc. Am. B 11, 2206-2215 (1994).
E. Yudilevich et al., "Restoration of signals from their signed Fourier-transform magnitude by the method of generalized projections," J. Opt. Soc. Am. A 4, 236-246 (1987).
A. Levi et al., "Image restoration by the method of generalized projections with application to restoration from magnitude," J. Opt. Soc. Am. A 1, 932-943 (1984).
Y. Yang et al., "Projection-based blind deconvolution," J. Opt. Soc. Am. A 11, 2401-2409 (1994).

\* cited by examiner

METHOD AND APPARATUS FOR DETERMINING WAVE CHARACTERISTICS USING CONSTRAINED INTERACTIONS OF WAVES

GOVERNMENT RIGHTS

The U.S. Government has a paid-up license in this invention and the right in limited circumstances to require the patent owner to license others on reasonable terms as provided for by the terms of Grant Nos. DOE DE-SC0006495 and DE-SC0011384.

BACKGROUND OF THE INVENTION

1. Field of the Invention

The present invention relates to a method and apparatus for retrieving phase and other information about ultrafast electromagnetic pulses from one or more pulses and may be used to provide multi-dimensional ultrafast laser diagnostics, among other applications.

2. Background

Ultrafast laser systems have numerous applications in biochemistry, chemistry, physics and electrical engineering. These systems generate laser pulses with durations of ten picoseconds or less and, for example, can be used to explore kinetics in proteins, examine carrier relaxation in semiconductors or image through turbid media. Ultrafast laser systems have recently been used as sources in semiconductor photolithography systems. They are also used as ultrafast probes in electronic circuits. New applications such as coherent control of chemical reactions require ultrafast laser pulses shaped in both intensity and phase. The continued development of all of these applications will require fast, high quality and easy-to-use ultrafast laser pulse diagnostics. The short duration of these ultrafast laser pulses means that they cannot be characterized or analyzed using conventional detection systems.

Frequency-resolved optical gating (FROG) is an ultrafast laser diagnostic tool that can measure the intensity and phase of an ultrafast laser pulse. At a basic level, a FROG system receives an input pulse and generates a three-dimensional plot of intensity versus frequency and time delay, known as a spectrogram, showing the spectral components of time slices of the input pulse. To do this, the FROG system splits the input pulse, or wave, into two identical pulses (waves) using a beam splitter. The system delays one of the pulses in time relative to the other and combines the two pulses in a nonlinear medium that multiplies the two pulses together. This configuration of FROG system uses one pulse to "gate" the other pulse. The gate pulse, which can have virtually any duration, slices out portions of a probe pulse in the time domain using either an instantaneously responding nonlinear material or a nearly instantaneously responding medium. The sampled portion of the probe, or signal, is dispersed in a spectrometer. This FROG system outputs the spectrally resolved gated signal and records the spectrum as a function of time delay to form a spectrogram. The resulting spectrogram contains all the intensity and phase information about the probe pulse.

Spectrograms are close relatives to sonograms. Rather than displaying the arrival time of frequency filtered pulses (as a sonogram does), a spectrogram displays the frequency content of time slices of a pulse. While the spectrogram of the pulse serves as an intuitive display of the pulse, it is difficult to obtain quantitative information about the pulse from the spectrogram, and subtleties in the pulse structure may go unnoticed without knowledge of the actual pulse. To obtain the actual pulse from its spectrogram, the phase of the spectrogram must be determined using a phase retrieval process. This step—which extracts the pulse from the measured spectrogram—is the slowest step in existing FROG instrumentation. It is possible to characterize an individual femtosecond pulse, but the data analysis might take sixteen-orders of magnitude longer than the duration of the pulse itself. A simple error analysis may take hours. More than just a fast computer is needed to invert FROG traces in real time.

An exemplary FROG system overlaps two pulses in an instantaneously or nearly instantaneously responding $\chi^{(3)}$ or $\chi^{(2)}$ medium. Any medium that provides an instantaneous or near instantaneous nonlinear interaction may be used. Perhaps the most intuitive is a medium and configuration that provides polarization gating. For a typical polarization-gating configuration, optically induced birefringence due to the Kerr effect is the nonlinear optical interaction. The "gate" pulse causes the $\chi^{(3)}$ medium, which is placed between two crossed polarizers, to become slightly birefringent. The polarization of the "gated" probe pulse is rotated slightly by the induced birefringence, allowing some of the "gated" pulse to leak through the second polarizer. This is referred to as the signal. Because most of the signal emanates from the region of temporal overlap between the gate pulse and the probe pulse, the signal pulse contains the frequencies of the "gated" probe pulse within this overlap region. The signal is then spectrally resolved, and the signal intensity is measured as a function of wavelength and delay time $\tau$. The resulting trace of intensity versus delay and frequency is the spectrogram.

The resulting spectrogram can be expressed as:

$$S_E(\omega, \tau) = \left| \int_{-\infty}^{\infty} E(t) g(t - \tau) e^{-i\omega t} dt \right|^2 \tag{1}$$

where E(t) is the measured pulse's electric field and g(t−τ) is the variable-delay gate pulse. The gate pulse g(t) is usually (but not necessarily) somewhat shorter in length than the pulse to be measured, but not infinitely short. This is an important point: an infinitely short gate pulse yields only the intensity I(t) of the pulse to be measured and conversely a continuous wave (CW) gate yields only the spectrum I(ω) of the pulse to be measured. On the other hand, a finite-length gate pulse yields the spectrum of all of the finite pulse segments with duration equal to that of the gate. While the phase information remains lacking in each of these short-time spectra, having spectra of an infinitely large set of pulse segments compensates for this deficiency. The spectrogram nearly uniquely determines both the intensity I(t) and phase φ(t) of the pulse, even if the gate pulse is longer than the pulse to be measured. If the gate is too long, sensitivity to noise and other practical problems arise.

For a FROG system using the Kerr effect (optically induced birefringence in a $\chi^{(3)}$ medium) as the nonlinear effect, the signal pulse has the form:

$$E_{sig}(t,\tau) \partial E(t) |E(t-\tau)|^2. \tag{2}$$

So the measured signal intensity $I_{FROG}(\omega,\tau)$, or the FROG trace, after the spectrometer is:

$$I_{FROG}(\omega, \tau) = \left| \int_{-\infty}^{\infty} E(t)|E(t-\tau)|^2 e^{-i\omega t} dt \right|^2 \quad (3)$$

The FROG trace is a spectrogram of the pulse $E(t)$ and the gate, $|E(t-\tau)|^2$, is a function of the pulse itself.

FROG is not limited to the optical Kerr effect. Second harmonic generation (SHG) FROG can be constructed to analyze pulses and is typically more sensitive than polarization-gating FROG. For SHG FROG, the pulse is combined with a replica of itself in an SHG crystal as illustrated in, for example, U.S. Pat. No. 7,130,052.

The FROG trace essentially uniquely determines $E(t)$ for an arbitrary pulse. $E(t)$ is easily obtained from $E_{sig}(t,\tau)$, shown above in equation (2). Equation (3) can then be written in terms of $E_{sig}(t,\Omega)$, the Fourier transform of the signal field $E_{sig}(t,\tau)$ with respect to delay variable ti. This gives the following, apparently more complex, expression:

$$I_{FROG}(\omega, \tau) = \left| \int_{-\infty}^{\infty} E_{sig}(t, \Omega) e^{(-i\omega t - i\Omega\tau)} dt d\Omega \right|^2. \quad (4)$$

Equation (4) indicates that the problem of inverting the FROG trace $I_{FROG}(\omega,\tau)$ to find the desired quantity $E_{sig}(t,\tau)$ is that of inverting the squared magnitude of the two-dimensional Fourier transform of $E_{sig}(t,\tau)$, which is the two-dimensional phase-retrieval problem. While the one-dimensional phase retrieval problem is known to be unsolvable (for example, infinitely many pulse fields give rise to the same spectrum), two- and higher-dimension phase retrieval essentially always yield unique results.

Extracting pulse information from the measured FROG trace can use an iterative two-dimensional phase retrieval process. This phase retrieval process is intended to converge to a pulse that minimizes the difference between the measured FROG trace and the calculated FROG trace. Application of this phase retrieval process to FROG can be problematic and slow. Some phase retrieval processes use a generalized projections strategy, which converges quickly to make FROG a real-time pulse measurement technique. Indeed, programs for analyzing FROG traces in this manner are commercially available. The generalized projections strategy remains unacceptably slow for many applications and can be prone to stagnation.

Another strategy for phase retrieval in the polarization gate (PG) and second harmonic generation (SHG) FROG geometries is called principal components generalized projections (PCGP). PCGP converts the generalized projections technique into an eigenvector problem and achieves pulse characterization rates of greater than 20 Hz. U.S. Pat. No. 6,219,142 describes the PCGP method and its success in characterizing pulses without using multivariate minimization. The PCGP method is designed as a blind inversion strategy; that is, the PCGP method assumes the probe and the gate are independent and the method does not use information known about the probe or gate pulses. This alone can lead to errors. The '142 patent describes certain accommodations to limit these errors, but there continues to be a possibility for errors and stagnation. In addition, these accommodations generally require knowledge of an inverse to the relationship between the gate and probe, which may not exist or may not be known in sufficient detail to be useful.

U.S. Pat. No. 9,423,307 describes a system known as cross-correlation frequency-resolved optical gating or "X-FROG." The X-FROG strategy described in the '307 patent analyzes and characterizes an unknown wave based on its interaction with a known wave within a modified principal component generalized projection strategy. The strategy described in the '307 patent allows for retrieval of phase and other wave characteristics about the unknown pulse by using the completely characterized known wave. Unfortunately, the sort of information used in the X-FROG strategy of the '307 patent is not consistently available. It would be useful to provide FROG implementations that can utilize other forms of external constraints or an incomplete description of the probe or gate pulses.

SUMMARY OF THE PREFERRED EMBODIMENTS

An aspect of the present invention provides a method for determining characteristics of one or more waves. The method provides wave phenomena data configured using a reversible transform of a product of at least two waves. The method further comprises determining characteristics of the wave from the wave phenomena data by using a constraint and generating a constrained outer product.

Another aspect of the present invention provides a method for determining characteristics of an unknown ultrafast electromagnetic wave including receiving trace data obtained by an acquisition system that received the unknown ultrafast electromagnetic wave as an input. The trace data includes a set of intensity values as a function of a first variable and of delay. The received trace data is stored in a memory of a processing system. At least one processor generates a first wave pattern, a first outer product responsive to the first wave pattern and first synthetic trace data responsive to the first outer product. The method adjusts the first synthetic trace data using the set of intensity values for the received trace data to provide adjusted first synthetic trace data and generates a second wave pattern responsive to the first wave pattern and the adjusted first synthetic trace data. A constrained second wave pattern responsive to the second wave pattern and at least one constraint is generated and a second outer product and second synthetic trace data are generated responsive to the constrained second wave pattern. The at least one processor retrieves a phase characteristic of the unknown ultrafast electromagnetic wave responsive to the second synthetic trace data and generates a display of the phase characteristic.

BRIEF DESCRIPTION OF THE DRAWINGS

The accompanying drawings, which are incorporated into and form a part of the specification, illustrate several embodiments and, together with the description, explain the principles of these embodiments. The drawings are illustrative and are not to be construed as limiting.

DESCRIPTION OF THE PREFERRED EMBODIMENTS

A preferred aspect of the present invention determines characteristics of an unknown wave by generating and analyzing a frequency-resolved optical gating (FROG) trace from an input unknown wave. This aspect most preferably uses a constraint or constraints, such as independently measured or derived information about the unknown wave, in analyzing the FROG trace. For example, a FROG system may receive an ultrafast laser pulse as the "unknown wave" input to the system. The FROG system preferably generates a spectrogram (FROG trace) of the input pulse using a polarization gate, second harmonic generation or other FROG geometry. The system or method preferably analyzes the spectrogram using constrained outer products and principal component generalized projections to find characteristics of the unknown wave such as intensity and phase. Examples of constrained outer products include outer products that incorporate an external constraint such as spectral information or an internal constraint such as a relationship between the probe and gate components derived from the unknown wave.

The constrained principal component generalized projections (C-PCGP) strategy described here provides useful improvements over past strategies. By incorporating internal or external constraints into, for example, generating the next iteration of the probe or gate estimate, preferred implementations can provide better convergence and greater accuracy while avoiding certain errors. In this context, internal constraints include relationships between the probe and gate pulses, while external constraints include spectral constraints and other measured or known characteristics of the pulses. Internal constraints can include expressions of mathematical constraints associated with a particular FROG geometry. Preferred implementations can provide fast inversion speed and compact code that can run efficiently on a processor, multiprocessor, digital signal processor (DSP), graphics processing unit (GPU), arrays of GPUs with or without other processors, combinations of these elements or other computer systems. The described implementations are particularly well suited to run on multiprocessor computers such as those using multiple graphics processing units and in cloud-based systems where processing is remote from the spectrogram acquisition hardware.

Figure 1:
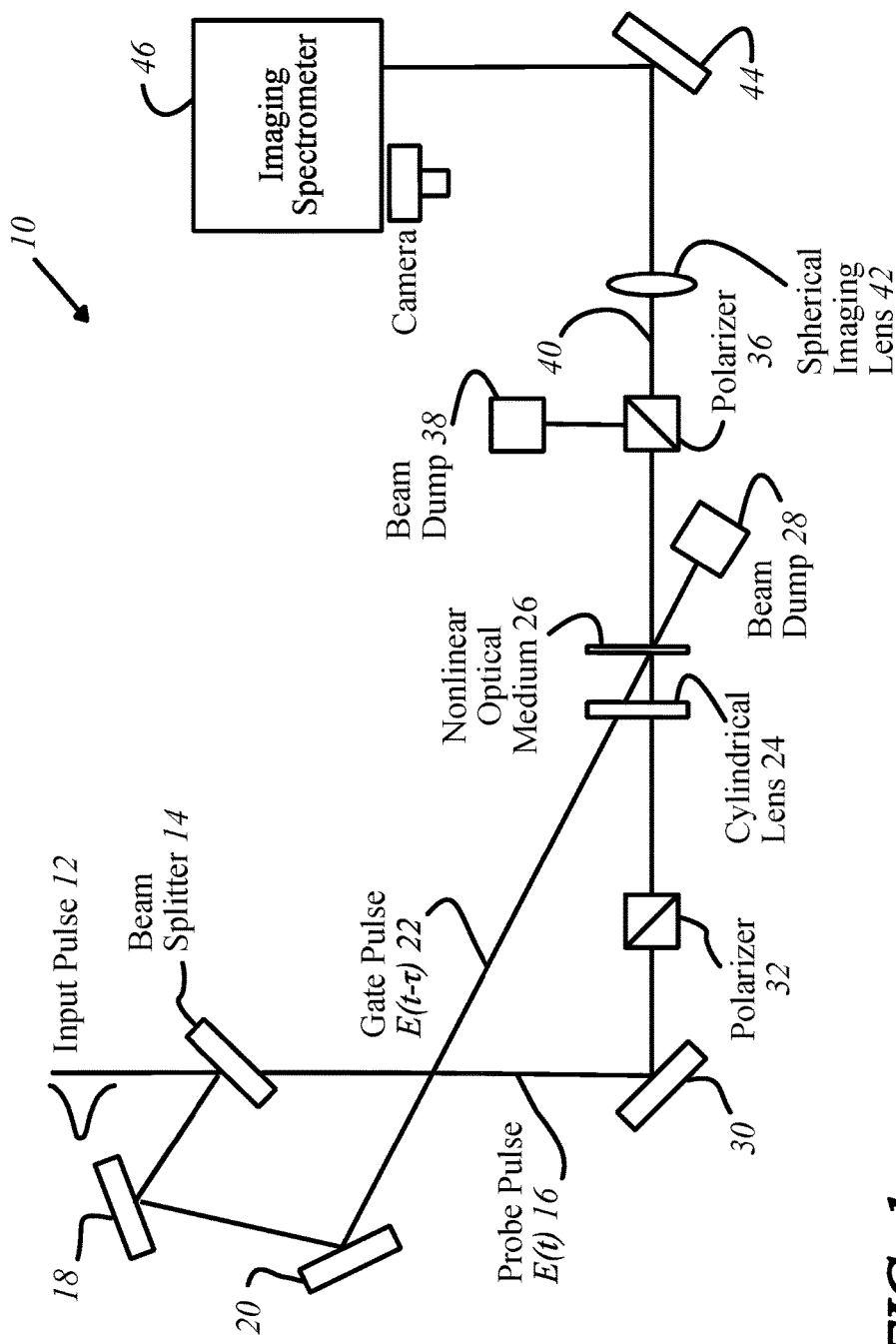
FIG. 1 schematically illustrates a frequency resolved optical gating (FROG) system that uses the optical Kerr effect or polarization gating as the non-linearity to measure a spectrogram of a pulse.

Preferred system implementations of the present invention combine optical, mechanical and processing elements in a FROG system to analyze or characterize ultrafast signals such as ultrafast laser pulses. It is useful to discuss a specific example of a FROG system and so this disclosure begins with a discussion of the system shown in FIG. 1. FIG. 1 shows a specific example of a FROG system that uses polarization gating (the optical Kerr effect) as the multiplication that facilitates analysis of the ultrafast signal. Later this discussion addresses an additional illustration of second harmonic generation (SHG) as the multiplication used to generate the spectrogram. Aspects of the present invention can be implemented with the polarization gating illustrated in FIG. 1, the harmonic generation system illustrated in FIG. 3, in FROG systems using other multiplications such as intensity or phase modulators or shutters, and in some non-FROG systems.

FIG. 1 shows a FROG system 10 configured to receive an input pulse, to generate a probe pulse and a gate pulse, and to overlap the probe pulse and the gate pulse in the nonlinear (Kerr effect) optical medium. Here, the nonlinearity of the medium is what carries out the desired multiplication. The system extracts a resulting signal from the nonlinear medium and provides that resulting signal to a detector such as a camera or an imaging spectrometer. The detected signal obtained for a range of different delays between the probe and gate pulses is output as a spectrogram for phase retrieval analysis.

Preferably the input pulse 12 is an ultrafast laser pulse such as a laser pulse having a duration of less than a few tens of picoseconds. This illustration assumes that the ultrashort laser pulse is linearly polarized. In the FIG. 1 example, the system provides the input pulse 12 to a beam splitter 14 that splits the input pulse into two components, with the probe pulse component in the FIG. 1 illustration propagating along the direction of the input pulse 12 and the beam splitter directing the gate pulse component out of the plane of the other system 10 components. The beam splitter 14 directs the gate pulse component split off from the probe pulse 16 to first mirror 18 and second mirror 20 that together direct the gate pulse 22 back into the plane of the system 10 and towards the nonlinear medium. The gate pulse reflects from the beam splitter 14 and mirrors 18 and 20 to produce a gate pulse 22 with the polarization rotated with respect to the probe pulse 16.

The polarization-rotated gate pulse 22 propagates through cylindrical lens 24 to the nonlinear optical (e.g., Kerr effect $\chi^{(3)}$) medium 26. Cylindrical lens 24 focuses the gate pulse 22 into a line at the nonlinear optical medium 26, where the gate pulse 22 alters the local birefringence of the nonlinear optical medium 26. The physical angle between the gate pulse 22 and the probe pulse 16 at the nonlinear medium 26 creates a range of relative delays at the non-linear medium so that the gate pulse 22 is described by $E(t-\tau)$, where $E(t)$ describes the probe pulse and $\tau$ is the delay between the probe pulse 16 and the gate pulse introduced by the angle between the gate and probe pulses. $\tau$ varies across the lateral dimension of the nonlinear medium 26. A beam dump 28 disposes of that portion of the gate pulse 22 that passes through the nonlinear medium 26.

Mirror 30 directs the probe pulse 16 through a first polarizer 32, the cylindrical lens 24, the nonlinear optical medium 26 and to a second polarizer 36. Cylindrical lens 24 focuses the probe pulse 16 into a line at the nonlinear optical medium 26. The first and second polarizers function as an analyzer. Thus, the first polarizer 32 is configured to align with the expected polarization of the input and probe pulses and so functions to "clean up" the probe pulse 16 to remove light with stray or unwanted polarizations. Polarizer 36 is configured with an orthogonal polarization to the probe pulse 16 light exiting the first polarizer 32. The second polarizer 36 thus blocks or reflects probe pulse light from the probe pulse 16 that does not have its polarization changed by the nonlinear optical medium 26. Beam dump 38 receives and disposes of the blocked or reflected probe pulse signal.

The gate pulse 22 causes the nonlinear optical medium 26 to become slightly birefringent. The induced birefringence in the nonlinear optical medium 26 slightly rotates the polarization of the "gated" probe pulse 16, allowing some of the "gated" pulse to leak through the second polarizer 36. This is the signal. Because most of the signal emanates from the region of temporal overlap between the gate pulse 22 and the probe pulse 16, the signal pulse 40 contains the frequencies of the "gated" probe pulse within this overlap region. Spherical lens 42 captures the signal pulse 40 and focuses the signal pulse, which is directed by a mirror 44 to a camera or imaging spectrometer 46.

The camera or imaging spectrometer 46 spectrally resolves the signal pulse 40 and measures the signal intensity as a function of wavelength or frequency and delay time $\tau$. Different delays between the probe and gate pulses are present at different positions laterally across the nonlinear optical medium 26. This "single-shot" geometry provides a useful range of delays through the angle between the probe and gate pulses and the line focus at the nonlinear medium 26, which effectively maps delays onto lateral positions, which are then imaged onto the width of the detector 46. The resulting FROG trace of intensity versus delay time $\tau$ and frequency is the spectrogram. This FROG trace is the starting point for phase retrieval and the reconstruction of the ultrafast laser pulse.

Alternatively, the FIG. 1 system can be configured to provide spot focusing of both the gate and probe beams at the nonlinear medium. This configuration preferably provides a delay line along the gate beam path to provide a selectable relative delay between the gate pulse and the probe pulse. Then, the system is operated to measure the intensity as a function of frequency for each of a series of relative delays. This scanning configuration provides better flexibility and accuracy as compared to the single-shot geometry. Such a scanning system is illustrated in FIG. 1 of U.S. Pat. No. 6,219,142, which patent is incorporated here in its entirety. Preferably, the result is again a spectrogram for phase retrieval and analysis, although the system can generate and analyze a sonogram.

The discussion now focuses on inversion or retrieval strategies where constraints can be successfully applied to improve convergence. The process described here is useful for all known FROG geometries and this discussion will include a further illustration for second harmonic generation (SHG) following this introduction to a preferred set of inversion or retrieval strategies. The particularly preferred phase retrieval strategy is called constrained principal components generalized projections (C-PCGP) and is well suited for FROG phase retrieval or other phase retrieval applications involving spectrograms or sonograms that can have two or more dimensions.

Phase retrieval begins by constructing a simulation of a FROG trace corresponding to discrete input (e.g., optical field) vectors. Adjustments can then be made to the vectors, the trace or other forms of the simulated data to match the simulated FROG trace or other form to the experimental data. Simulated FROG traces can be constructed from the outer product of discrete vector pairs. The outer product is well-known from linear algebra. Two vectors of length N are used to represent a discrete form of the probe and the gate fields:

$$E_{Probe} = [E_1, E_2, E_3, E_4, \ldots, E_N]$$

$$E_{Gate} = [G_1, G_2, G_3, G_4, \ldots, G_N] \qquad (5)$$

The outer product of $E_{Probe}$ and $E_{Gate}$ is:

$$\begin{bmatrix} E_1G_1 & E_1G_2 & E_1G_3 & E_1G_4 & \ldots & E_1G_N \\ E_2G_1 & E_2G_2 & E_2G_3 & E_2G_4 & \ldots & E_2G_N \\ E_3G_1 & E_3G_2 & E_3G_3 & E_3G_4 & \ldots & E_3G_N \\ E_4G_1 & E_4G_2 & E_4G_3 & E_4G_4 & \ldots & E_4G_N \\ \vdots & \vdots & \vdots & \vdots & \ldots & \vdots \\ E_NG_1 & E_NG_2 & E_NG_3 & E_NG_4 & \ldots & E_NG_N \end{bmatrix}. \qquad (6)$$

This is referred to as the outer product form or the outer product form matrix. In the following discussion, the outer product form matrix is identified by the capital O and the transpose of the outer product form matrix is identified as O*. While there are an infinite number of complex images that have the same magnitude as the measured FROG trace, there is only one image that is formed by the outer product of a single pair of vectors that has the same magnitude as the measured FROG trace.

The retrieval or inversion manipulates the rows of the outer product form matrix to generate an equivalent matrix that gives a time domain representation of a FROG trace. By leaving the first row unshifted and by shifting (rotating) subsequent rows to the left, the following matrix results:

$$\begin{bmatrix} E_1G_1 & E_1G_2 & E_1G_3 & \ldots & E_1G_{N-2} & E_1G_{N-1} & E_1G_N \\ E_2G_2 & E_2G_3 & E_2G_4 & \ldots & E_2G_{N-1} & E_2G_N & E_2G_1 \\ E_3G_3 & E_3G_4 & E_3G_5 & \ldots & E_3G_N & E_3G_1 & E_3G_2 \\ E_4G_4 & E_4G_5 & E_4G_6 & \ldots & E_4G_1 & E_4G_2 & E_4G_3 \\ \vdots & \vdots & \vdots & \ldots & \vdots & \vdots & \vdots \\ E_NG_N & E_NG_1 & E_NG_2 & \ldots & E_NG_{N-3} & E_NG_{N-2} & E_NG_{N-1} \end{bmatrix}. \qquad (7)$$
$$\tau=0 \quad \tau=-1 \quad \tau=-2 \quad \ldots \quad \tau=+3 \quad \tau=+2 \quad \tau=+1$$

The $\tau=0$ column is the first column, where $\tau$ is the time delay in resolution element number (column number), which is just the probe multiplied by the gate with no time shift between them. The next column is the $\tau=-1$ column where the gate is delayed relative to the probe by one resolution element. After some column manipulation, the most negative T is on the left and the most positive on the right; this time domain FROG trace (of EQ. 7) is the discrete version of the product $E_{Probe}(t)E_{Gate}(t-\tau)$. The columns are constant in $\tau$ (relative delay) while the rows are constant in t (time). The delay here can be in, for example, distance instead of time. This transform from the outer product form to a representation of the time domain FROG trace is sometimes identified as a reversible 1:1 transform or more simply as a 1:1 transform.

The process or system Fourier transforms each column of the matrix shown in equation 7 to the frequency domain using a fast Fourier transform (FFT) or other suitable method. The final step of squaring the magnitude of the complex result produces the simulated FROG trace. The simulated FROG trace can be modified according to the measured FROG trace and then further processed in retrieving the characteristics of the pulse. Modifying the simulated FROG trace for an iteration allows the process to correspondingly modify the gate and probe field estimates and to propagate the adaptation though the retrieval or inversion strategy. According to preferred aspects of the present invention, other information such as externally obtained beam characteristics or relationships between the gate and probe fields can also be used to adapt the simulated FROG trace or the simulated gate or probe fields.

Figure 2:
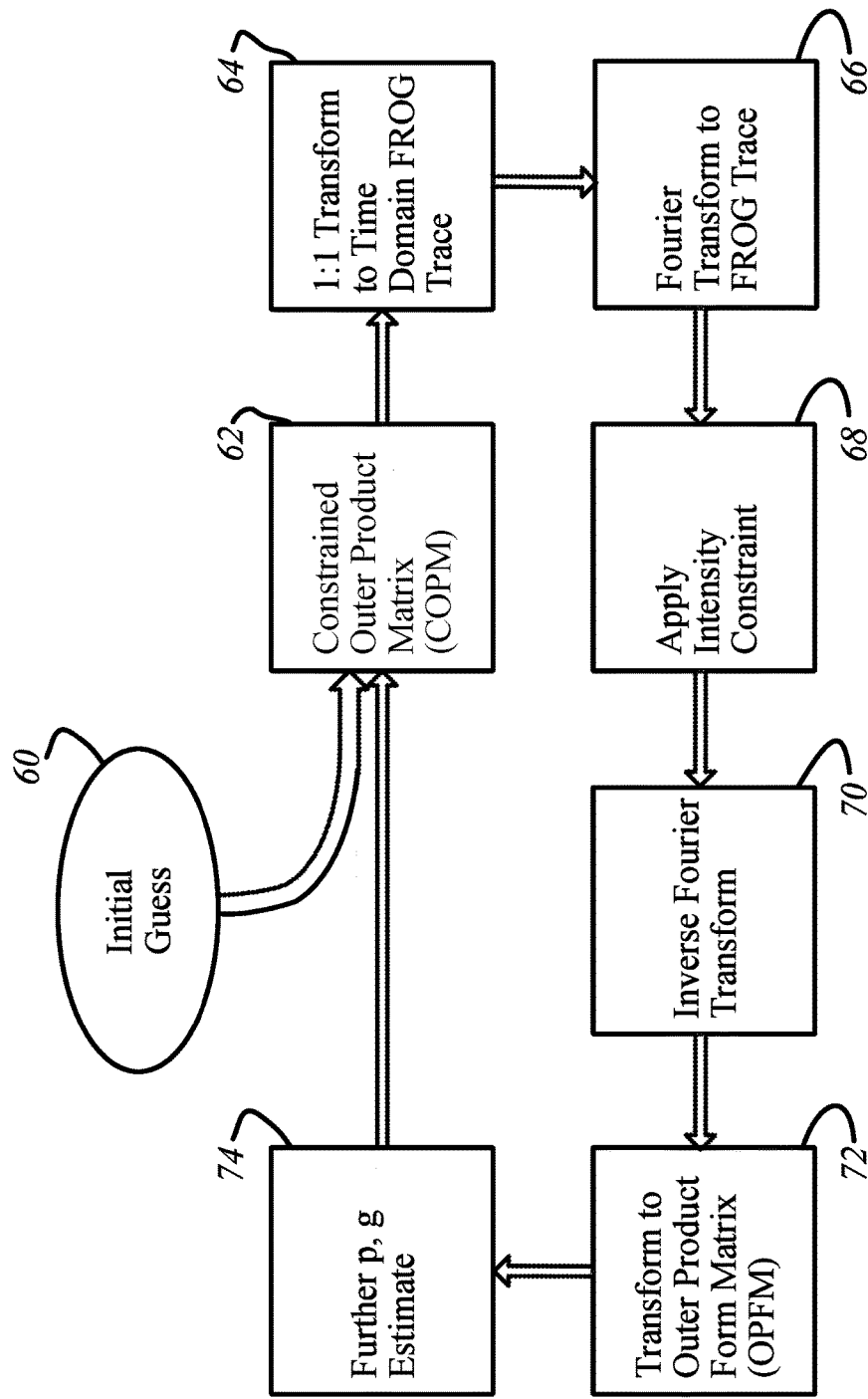
FIG. 2 is a schematic illustration of the constrained PCGP phase retrieval.

The constrained principal components generalized projections (C-PCGP) system uses an iterative method to find a desired vector pair that corresponds to the measured FROG trace and other constraints. FIG. 2 shows the flow of a preferred C-PCGP strategy. The illustrated strategy uses the techniques and structures in equations 5-7 in analyzing the measured FROG trace and constraints. FIG. 2 shows that the FROG retrieval process or system alternates between a current simulated iteration of a FROG trace and the outer product form matrix generated in part using the updated (to that iteration) estimates of the gate and probe fields. Certain of the illustrated procedures change the form of the current estimates between the FROG trace and the outer product form matrix. Others of the illustrated procedures are to update the estimates based on experimental data, external constraints or internal constraints. The outer product form can be constrained in various ways according to either the mathematics of the wave interactions or by introducing external information such as knowledge of the spectrum of one of the pulses.

In the FIG. 2 illustration, the method or system provides an initial guess 60 for the unknown wave or pulse; the initial guess 60 usually takes the form of a noise modulated Gaussian. To construct the initial guess for the phase, a C-PCGP strategy constructs a FROG trace using vector pairs, one complex (probe) vector and, in the case of polarization-gate FROG, one real (gate) vector, that are random noise modulated by a broad Gaussian pulse. Outer products preferably including at least one constrained outer product are used to construct the constrained outer product matrix (COPM) 62. The constrained outer product can either be internally constrained or externally constrained, or any combination of both types with or without unconstrained outer products. Determining a particularly advantageous COPM is discussed below after further discussions that will facilitate the COPM discussion.

The COPM is transformed, preferably through matrix row rotations, into the time domain FROG trace 64. Transform 64 is identified as the 1:1 transform where the elements of the outer product matrix are rearranged to form the time domain FROG trace. An example of this operation is illustrated with respect to equation 7 and the associated discussion above. A Fourier transform 66 transforms the time domain FROG trace to the frequency domain. The magnitude of the newly constructed FROG trace is replaced by the square root of the magnitude of the measured (experimental) FROG trace (i.e., intensity) in step 68. That is, the FROG trace constraint is applied in the frequency domain. Inverse Fourier transform 70 transforms the FROG trace back to the time domain. The process reverses the 1:1 transform 72 by reversing the rearranging of matrix elements to transform 72 the matrix back to the outer product form matrix (OPFM) shown in, for example, equation 6.

After the transform 72, the flow of FIG. 2 generates 74 a next estimate for the gate and probe pulse vectors that will be used for the next iteration through the FIG. 2 flow. This process 74 generates appropriate estimates in different ways based on the available information and the geometry of the subject FROG system. When there is no relationship between the gate and the probe fields, or when it is acceptable to make this assumption, the next iteration gate and probe can be determined as follows. This example is for the polarization gate geometry (single shot or scanning) discussed above; other geometries are illustrated below. The product of the OPFM, O, with its transpose O* transforms 74 the probe pulse, $p_i$, into the next guess for the probe pulse $p_{i+1}$ using the relation $p_{i+1}=OO^*p_i$. Similarly, the function O*O transforms 74 the gate pulse, $g_i$, into the next guess for the gate, $g_{i+1}$, and in the case of polarization gate, $g_{i+1}=|O^*Og_i|$. In summary, $$p_{i+1}=OO^*p_i$$

$$g_{i+1}=|O^*Og_i| \quad (8).$$

In equation 8, a multiplied constant related to the eigenvalue of the dominant vector is omitted, since it is a scaling factor. This OO* or O*O multiplication, which implements the power method, could be repeated but in practical terms it is generally sufficient to perform the multiplication once. The functions OO* and O*O map a probe pulse and a gate pulse, respectively, to a projection for the next iteration in the polarization gate geometry. Alternately, the new estimates for the gate and probe fields can be determined using the singular value decomposition (SVD) procedure described in U.S. Pat. No. 6,219,142, which is incorporated by reference in its entirety.

If there is a relationship between the gate and probe pulses, as often occurs in FROG implementations, it may be preferable to generate 74 the next iteration's gate and probe pulses considering that relationship and use an appropriate operator to determine one or both of the probe and gate pulses. One such relationship is the mathematical form relationship between the gate and probe in the polarization gate geometry, as is discussed in U.S. Pat. No. 9,423,307, which is incorporated by reference in its entirety. For the polarization gate geometry, the next iteration's gate or probe can be taken as:

$$p'_{i+1}=O|p_{i+1}|^2$$

$$g'_{i+1}=|Og_{i+1}|^2 \quad (9).$$

The equation 9 relations include the relevant mathematical form relationship; a scaling factor related to the eigenvalue corresponding to O is omitted from both statements of the equation. The operator O, an OPFM, is from the i-th iteration when calculating the value for the (i+1)-th probe and gate iterations.

In the first of the equation 9 statements for the polarization gate geometry, the function $|p_{i+1}|^2$ is close to the gate function. The operator O projects the $|p_{i+1}|^2$ function to the probe space and generally corrects the $|p_{i+1}|^2$ for variations from the actual gate at that iteration. The operator 0 maps the $|p_{i+1}|^2$ function to the best estimate of the probe (in a least squares sense) for that iteration. Similarly, the function $Og_{i+1}$ maps the gate to the best estimate of the probe, which is then converted to the gate space by the absolute value squared function shown in equation 9.

The equation 9 determination of the next estimates for the probe, $p'_{i+1}$, preferably uses the $p_{i+1}$ determined by equation 8. Similarly, equation 9 preferably uses the $g_{i+1}$ from equation 8 when using equation 9 to determine the next iteration of the gate vector estimate, $g'_{i+1}$. Preferably, when the FIG. 2 flow uses the equation 9 relations to determine the next iteration probe $p'_{i+1}$ and gate $g'_{i+1}$ vectors, the flow does not use the equation 9 statements for every iteration. The present inventor has observed that using only the equation 9 statements for determining next estimates for the probe and gate vectors leads to stagnation. Instead, preferred implementations of the polarization gate FIG. 2 flow use the equation 9 statements interspersed with use of only the equation 8 statements. This illustration is for use of the mathematical form constraint for the polarization gate. Applying other constraints, such as applying spectral constraints, is discussed below.

The results of generating 74 the next estimates for the two pulses are then inserted to the COPM generation 62 and steps 62 through 74 in the FIG. 2 flow are repeated until convergence. The next iteration of the process creates another iteration of the constrained outer product form matrix. It is currently preferred that a constrained outer product form matrix is used on each iteration, although it is possible to include other outer product matrix forms in the process. Currently that is expected to be inefficient but the process will work so long as a version of the constrained outer product matrix is used for most iterations.

Selection of the COPM for an implementation of the FIG. 2 flow is particularly preferred to enhance convergence and the effectiveness of the applied constraints. An exemplary constrained outer product matrix 62 for the FIG. 2 FROG retrieval is given by, for example, equation 10:

$$O_{i+1}=\text{probe}_{i+1}\otimes\text{gate}_{i+1}+\text{probe}'_{i+1}\otimes\text{gate}_{i+1}+\text{probe}_{i+1}\otimes\text{gate}'_{i+1}. \tag{10}$$

$O_{i+1}$ is an outer product matrix formed as the sum of three outer product matrices. In equation 10, $O_{i+1}$ is the outer product form matrix for the (i+1)-th iteration and is based on estimates obtained through process 74. The symbol $\otimes$ designates the outer product operator, so that $\text{probe}_{i+1}\otimes\text{gate}_{i+1}$ produces an outer product matrix like that shown in equation 7 from the (i+1)-th iteration probe and gate vectors given by, for example, equation 8. Equation 9 produces the $\text{probe}'_{i+1}$ and $\text{gate}'_{i+1}$ vectors in this illustration of the polarization gate geometry. Using equation 10 as the form of the constrained outer product matrix provides better convergence and immunity to a time center offset artifact. The time center offset artifact can degrade retrieval accuracy unless the FROG trace is nearly perfectly centered in the time window.

In preferred implementations, the equation 10 OPFM as written is not used for all iterations. Rather, it is preferred that the retrieval or inversion use the three illustrated matrices of equation 10 to make up the OPFM $O_{i+1}$ during alternating iterations, with the intervening iterations taking the OPFM $O_{i+1}$ as only the first term, so that OPFM $O_{i+1}=\text{probe}_{i+1}\otimes\text{gate}_{i+1}$. For example, odd iterations may use OPFM $O_{i+1}$ as the sum of three matrices as written in equation 10; for these iterations both of equations 8 and 9 are used in generating estimates of the probe and gate vectors. Even iterations may use OPFM $O_{i+1}=\text{probe}_{i+1}\otimes\text{gate}_{i+1}$ and preferably use only equation 8 in generating further estimates of the probe and gate vectors. Other variations can be used to optimize the convergence of the flow illustrated in FIG. 2 for the desired geometry and implementation. In addition, it may be acceptable to implement a different form of OPFM $O_{i+1}$ for a first, initialization iteration or to implement a different form of OPFM for some iterations.

Outer products like that shown in equation 10 using multiplication by the outer product matrix or its transpose to construct a gate from the probe or the probe from the gate are called constrained outer products. Constrained outer products formed without using external information, such as by using only the mathematical formulation of the wave interaction, as in equation 10, are called internally constrained outer products. Constrained outer products obtained from external information, such as measured wave spectra or wave intensities, are called externally constrained outer products. Even using only internal constraints, such as a mathematical relationship between the gate and probe pulses, inversion performance can be significantly improved. When other, additional information, such as wave spectra, is available, externally constrained outer products can be summed with other outer products to form the constrained outer product matrix (COPM) to improve convergence. Other examples of OPFM include:

$$O_{i+1}=\text{probe}'_{i+1}\otimes\text{gate}'_{i+1} \tag{11}$$

and $$O_{i+1}=\text{probe}_{i+1}\otimes\text{gate}_{i+1}+\text{probe}'_{i+1}\otimes\text{gate}'_{i+1}. \tag{12}$$

In practical implementations, equation 11 has been observed to be more likely to converge.

While outer products can be summed to form the COPM, as shown in equation 10, the sum is not necessarily a projection because the sum is typically just an average of the outer products. Not using a projection can hurt convergence and stability of the processing and the measurement. Methods such as singular value decomposition (SVD) can be used to extract a projection instead of merely using a sum of outer products to produce the COPM. Singular value decomposition can be applied directly to the COPM to find its rank 1 projection, or each outer product (both constrained and otherwise) can be remapped into a column vector in a matrix (or equivalently a row vector) such that each column of the matrix is one of the remapped outer products that would have been summed, which can be called the outer product matrix. Singular value decomposition applied to the matrix can be used to extract an outer product that is a projection. Results from the singular value decomposition can also be used to determine which outer products are the best projections and the processing shown in FIG. 2 can preferentially use weights obtained from the singular value decomposition as feedback.

A COPM that is a projection can also be obtained by using the power method on the outer products matrix. While this may not be as accurate as the full singular value decomposition, it is computationally much faster, and may result in faster convergence. In general, the sum of three outer products as shown in equation 10 seems to work well, without the need to find a projection. The discussion now provides an illustration of a second harmonic generation geometry and how the constrained outer products strategy is implemented in that context.

Figure 3:
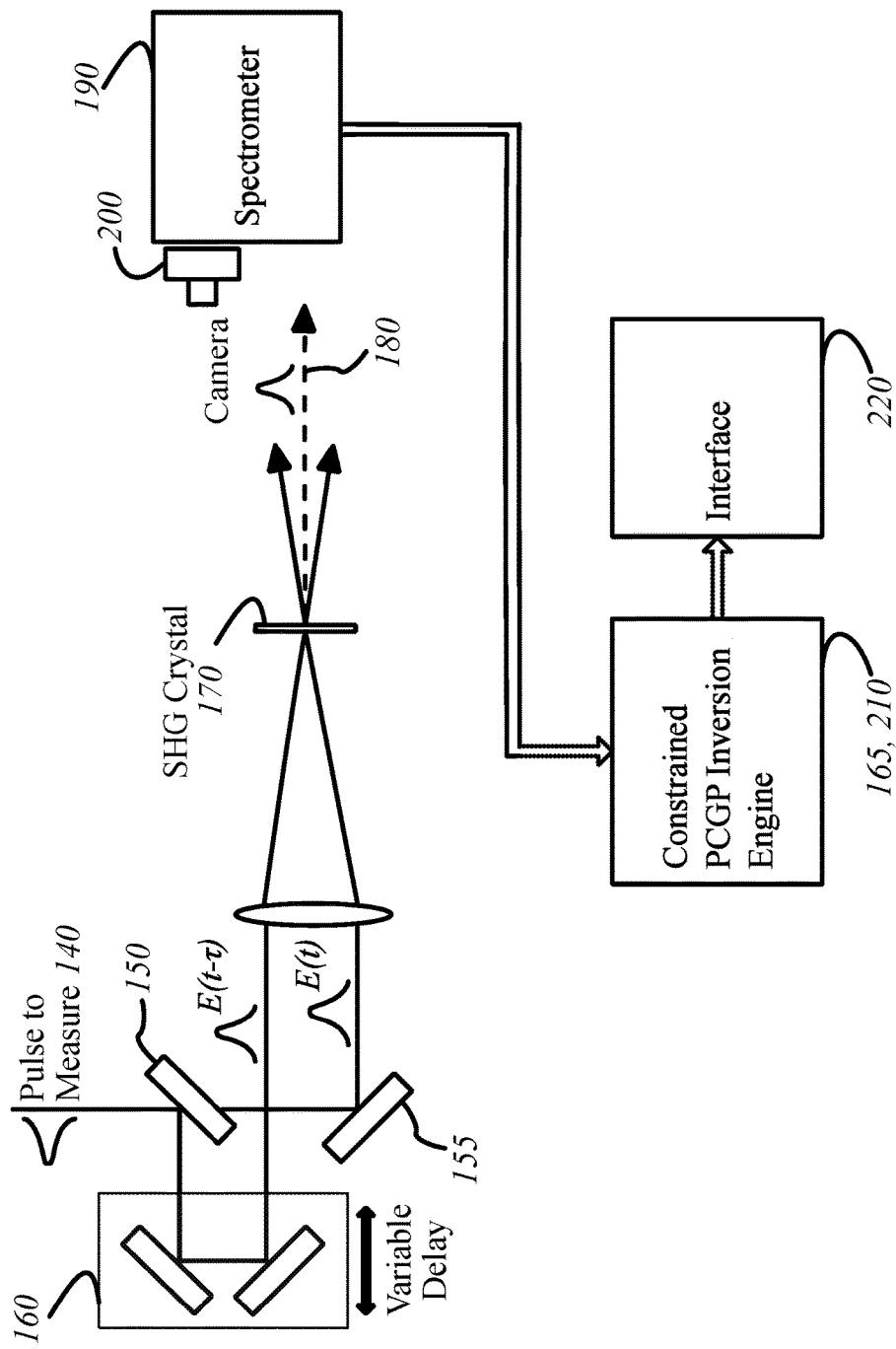
FIG. 3 is a schematic diagram showing the integration of C-PCGP with a second harmonic generation (SHG) FROG device.

FIG. 3 shows a FROG device coupled to an inversion engine using the constrained PCGP strategy. FIG. 3 is described in the context of a second harmonic generation (SHG) nonlinear medium, but other nonlinear media can be used. While polarization gating is primarily described in the context of FIG. 1's single shot geometry, the FIG. 3 geometry including the illustrated delay line can be adapted to implement polarization gating. Alternately, the FIG. 3 system and method can be used for third harmonic generation (THG) or self-diffraction geometries. The input pulse or wave 140 is split into two components using a beam splitter 150. Often, a spatial beam splitter 150 is used that splits the pulse spatially into two components.

The FIG. 3 system directs a gate component of the input pulse through an optical delay line 160 to delay that gate component while the other probe component of the pulse is not delayed 155. Those of ordinary skill will appreciate that the designation of one pulse as the gate and the other pulse as the probe in this geometry is arbitrary and the designations can be switched without altering the analysis. The delay line 160 is designed to provide controlled and precise relative delay increments between the gate and the probe pulses under control of host computer 165.

The two pulses are focused into a nonlinear medium 170, in this illustration a second harmonic generation (SHG)

crystal, to produce a signal 180. For the SHG configuration, the signal 180 is an autocorrelation. The nonlinear medium can use a plurality of nonlinearities, although usually either $\chi^{(2)}$ or $\chi^{(3)}$ nonlinearities are used for FROG. The second harmonic generation crystal illustrated in FIG. 3 provides a $\chi^{(2)}$ nonlinearity. The signal 180 is spectrally resolved using a spectrometer 190 and recorded with a camera or other detector 200 that records the intensity of the signal as a function of frequency for a set of successive delays. This is the FROG trace data, which will generally be a spectrogram. In some instances, the data set may be recorded as a sonogram. Typically, the data are arranged as a function of relative time delay, but other delays can be used as discussed above. The measured data set is sent to a constrained outer product inversion engine 210 within the host computer 165. The constrained outer product inversion engine 210 uses the constrained PCGP strategy of, for example, FIG. 2, to obtain wave or pulse characteristics such as phase from the signal. An interface 220 communicates the results to a user or other process. Examples of interfaces are shown in U.S. Pat. No. 9,423,307, which is incorporated by reference here in its entirety.

Most of the FIG. 2 flow for the SHG geometry is implemented in the same manner as discussed above in the context of the polarization gate. Only the differences are discussed here, beginning with determining 74 the next estimates for the SHG geometry probe and gate pulses. After the transform 72, the flow of FIG. 2 generates 74 a next estimate for the gate and probe pulse vectors that will be used for the next iteration through the FIG. 2 flow. Assuming there is no relationship between the gate and the probe fields, or when it is acceptable to make that assumption, the next iteration gate and probe for the SHG geometry preferably is determined using the power method. The product of the OPFM, O, with its transpose $O^*$ transforms 74 the probe pulse, $p_i$, into the next guess for the probe pulse $p_{i+1}$ using the relation $p_{i-1}=OO^*p_i$. Similarly, the function $O^*O$ transforms 74 the gate pulse, $g_i$, into the next guess for the gate, $g_{i+1}$, $g_{i+1}=O^*Og_i$. In summary, $$p_{i+1}=OO^*p_i$$

$$g_{i+1}=O^*Og_i \qquad (13).$$

In equation 13, a multiplied constant related to the eigenvalue of the dominant vector is omitted, since it is a scaling factor. This $OO^*$ or $O^*O$ multiplication could be repeated but it is generally sufficient to perform the multiplication once. The functions $OO^*$ and $O^*O$ map a probe pulse and a gate pulse, respectively, to a projection for the next iteration. Alternately, the new estimates for the gate and probe fields can be determined using the singular value decomposition (SVD) procedure described in U.S. Pat. No. 6,219,142, which is incorporated by reference in its entirety.

If there is a relationship between the gate and probe pulses, as often occurs in FROG implementations, it may be preferable to generate 74 the next iteration's gate and probe pulses considering that relationship and use an appropriate operator to determine one or both of the probe and gate pulses. One such relationship is the mathematical form relationship between the gate and probe in the SHG geometry. For the SHG geometry, the next iteration's gate or probe can be taken as:

$$p'_{i+1}=Og_{i+1}$$

$$g'_{i+1}=O^*p_{i+1} \qquad (14).$$

The equation 14 relations include the mathematical form relationship; a scaling factor related to the eigenvalue corresponding to O is omitted from both statements of the equation. The operator O, an OPFM, is from the i-th iteration when calculating the value for the (i+1)-th probe and gate iterations.

In $O^*p_{i+1}$, the operator $O^*$ projects the current iteration of the probe estimate into the space of the gate to produce a current best estimate of the gate vector. Similarly, for $Og_{i+1}$, the operator O projects the current iteration of the gate into the space of the probe to produce a current best estimate for the probe vector. That is, the gate pulse is used to derive the next probe pulse or the probe pulse is used to derive the gate pulse. The operators $O^*$ and O map a known probe and gate to the best (in the least squares sense) gate and probe, respectively. These operators $O^*$ and O produce projections to the target (probe or gate) space. Typically, an implementation would only use one of the relationships listed in equation 14 and would do so on each iteration. It is of course possible to use different ones of the equation 14 components during different iterations, although that is not currently preferred. The determined 74 estimates of the probe and gate vectors for the next iteration are provided to the system for determining 62 the corresponding constrained outer product matrix (COPM).

By using projection techniques on the respective probe or gate vectors, a gate can be constructed from the probe and vice versa. "Projection" is used here in the linear algebra sense. In this way, preferred methods of using constrained outer products do not require the calculation of an inverse. A spectral constraint can be applied to the probe pulse by replacing the pulse spectrum with the spectral constraint and keeping the phase. The best gate pulse then can be constructed by applying the projection operator to the new probe pulse constructed in this way. Different combinations of constrained outer products can be used to construct a constrained outer product matrix from the newly constructed pulses.

The FIG. 3 system may construct 62 various constrained outer product form matrices, including for example the summed outer products of equation 10 and the OPFMs of equations 11 and 12. When equation 10 is used for the SHG geometry, all three terms preferably are used in each iteration, although some variations as discussed above can be used. The advantages and considerations discussed above with respect to equations 10-12 are similarly generally applicable to the SHG geometry. Another form of constrained outer product form matrix that is successful in retrieving the phase from SHG FROG traces is:

$$O_{i+1}=O_iO_i^*\text{probe}_i \otimes O_i^*O_i\text{gate}_i + O_i^*O_i\text{gate}_i \otimes O_i^*O_i\text{gate}_i \qquad (15).$$

For either the polarization gate or the SHG geometry, additional constraints, as needed, are applied to either the pulse or the gate and then using the respective equations 9 or 14 to determine the best complementary pulse or gate to use in further processing. For example, when the next guesses for the probe and gate are determined in FIG. 2 step 74, the spectral constraint can be applied to the pulse using the following equation:

$$\text{probe}_{constrained}=F^{-1}\left\{\frac{F\{\text{probe}\}}{|F\{\text{probe}\}|}\sqrt{I(\omega)}\right\}. \qquad (16)$$

In equation 16, $F\{\ \}$ is the Fourier transform, $F^{-1}\{\ \}$ is the inverse Fourier transform, and $I(\omega)$ is the intensity spectrum of the probe pulse. Process 74 of FIG. 2 generates a current estimate probe, for the (i+1)-th iteration based on estimates of the i-th iteration. The operation of equation 16 is applied for each element in the current iteration of the probe vector. The best gate for the spectrally constrained probe, $probe_{constrained}$, is then obtained using the appropriate statement from equations 9 or 14. For example in the SHG application, equation 14 is used and $gate_{constrained}=O^*Probe_{constrained}$. $gate_{constrained}$ is then used in the outer product directly rather than the intensity constrained pulse to help prevent stagnation. The reason is that the constrained pulse is not a projection solution to the best rank 1 approximation of O, but $gate_{constrained}$ is the best rank 1 approximation for the gate pulse of O assuming the constrained probe is a solution. A constrained outer product matrix can be determined from the sum of outer products:

$$O_{i+1}=probe_i \otimes gate_i+(O_i^*probe_{i\text{-}constrained}) \otimes gate_i+ probe_i \otimes (O_i gate_i), \quad (17)$$

where i is the iteration number, probe, is the i-th iteration of the probe pulse, $gate_i$ is the i-th iteration of the gate, $O_i$ is the constrained outer product matrix (COPM) from the previous iteration, and O% is its transpose. Thus, $probe_{i\text{-}constrained}$ is the constrained pulse whereby $O^*_i$ converts the constrained probe pulse to the constrained gate. Applying the spectral constraint in this manner reduces stagnation in the FIG. 2 processing.

Many different constraints can be used including combinations of internally and externally constrained outer products to form a constrained outer product matrix (COPM). Intensity constraints can be applied for both spectrogram and sonogram based measurements. In the case of a sonogram-based measurement, where the wave is in the frequency domain, the intensity constraint can be applied as:

$$probe_{constrained} = F\left\{\frac{F^{-1}\{probe\}}{|F^{-1}\{probe\}|}\sqrt{I(t)}\right\}, \quad (18)$$

where I(t) is the time domain intensity and F is the Fourier transform as discussed above. In the case of spectrogram measurements, an intensity constraint can be applied as:

$$probe_{constrained} = \frac{probe}{|probe|}\sqrt{I(t)}. \quad (19)$$

An intensity constraint can also be applied in analyzing a spectrogram only to regions where the intensity is known. For example, in the case of compact support the intensity is zero in the wings. In this case, an intensity constraint can be applied as $$Probe_{constrained}=probe \; a<t<b$$

$$Probe_{constrained}=0 \; t<a \text{ and } t>b \quad (20)$$

where the region between a and b defines where the probe pulse is known to be non-zero. Waves constrained in the equation 20 manner for spectrogram analysis preferably should be converted to the complementary wave identified in the equation 9 or 14 relations before being used in the outer product sum. Preferably, the constrained wave should be used as needed to create the COPM to improve convergence. Other forms of external contraints that can be applied similarly include knowledge of a pulse shape or the likelihood that such a pulse shape will occur, or knowledge of chirp. Other examples will be apparent to those of ordinary skill. Depending on the constraints used, different combinations of constrained outer products and unconstrained outer products may be needed to develop a robust processing strategy.

Combining the constrained PCGP strategy with hardware results in a robust measurement or imaging system. Because the constrained PCGP method is very fast, it can be used with real-time FROG devices as described in U.S. Pat. Nos. 8,068,230 and 7,130,052. On the other hand, because the constrained PCGP method is so robust, it can be used with any type of FROG hardware.

The resulting system is extremely robust. Convergence testing of the constrained PCGP system was conducted using a methodology similar to that published in D. J. Kane, *IEEE J. Quantum Electron* (1999). Three different tests were conducted by constructing test pulses from filtered random noise, random chirp (including self-phase modulation), and multiple pulses. A statistically significant set of test pulses from each category were used on a 64×64 grid. The system ran 200 iterations for each test pulse, and convergence was assumed to be a FROG trace error of $10^{-4}$ or below. For each test, the system constructed a pulse and gate using either a predicted SHG FROG interaction or a predicted polarization gate (PG) FROG interaction. The constrained PCGP system was started with an initial guess of a noise modulated Gaussian for the pulse. The system converged better than previous FROG retrieval strategies such as those described in U.S. Pat. No. 6,219,142 for pulses constructed from each category.

As mentioned above, the constrained PCGP strategy is sufficiently robust as to retrieve the pulse characteristics in a self-diffraction geometry. The FIG. 3 configuration can be used to obtain the FROG trace for the self-diffraction geometry and a properly adapted version of the FIG. 2 flow preferably is used for retrieving the pulse characteristics from the FROG trace. In the adapted FIG. 2 flow, the next estimates for the probe and gate vectors are determined 74 from, $$p_{i+1}=OO^*p_i$$

$$g_{i+1}=O^*Og_i \quad (21),$$

and $$g'_{i+i}=(Og_{i+1})^2 \quad (22).$$

The self-diffraction geometry preferably uses the following COPM 62:

$$O_{i+1}=p_{i+1} \otimes g_{i+1}+p_{i+1} \otimes g'_{i+1} \quad (23).$$

The second term is used only in every other iteration. Other aspects of the FIG. 2 flow are implemented as discussed above with respect to the PG and SHG geometries.

The constrained PCGP strategy can also be used to measure and analyze wave phenomena of sonograms. In the case of a sonogram, the probe pulse is the spectral or frequency representation of the input pulse. The gate is then a frequency filter that is shifted in frequency and the output is the frequency filtered output pulse. The temporal profile of the output pulse is then measured, which may for example be done by cross-correlating the output pulse with the input pulse, provided the input pulse is much shorter than the filtered output pulse. The system preferably then uses the constrained PCGP strategy to add external constraints such as the pulse spectrum or the shape of the frequency filter.

The constraints can be applied "softly" by combining both the direct outer product and the gate by using an externally constrained outer product:

$$O_{i+1} = \text{probe}_i \otimes \text{gate}_i + (O_i \text{gate}_{i\text{-constrained}}) \otimes \text{gate}_i, \quad (18)$$

where the first outer product of the sum is the "blind" or direct outer product, which is not constrained, and the second externally constrained outer product assumes an external constraint applied to the gate.

There is no restriction on the waves, vectors, or pulses; they only need to be represented by a vector. Possible additional applications include using a preferred constrained PCGP implementation in any situation where the gate could be known a priori such as frequency-resolved optical gating for complete reconstruction of attosecond bursts (FROG CRAB) or using phase modulators to characterize ultrafast laser pulses (Jiang, et al., Opt. Comm. (2002)). These applications might benefit from the ability to add constraints to process the input waves, thereby improving the stability of the system as compared to the completely blind FROG system that is currently used. The pulses or waves can be real, imaginary, complex, or phase only.

Figure 4:
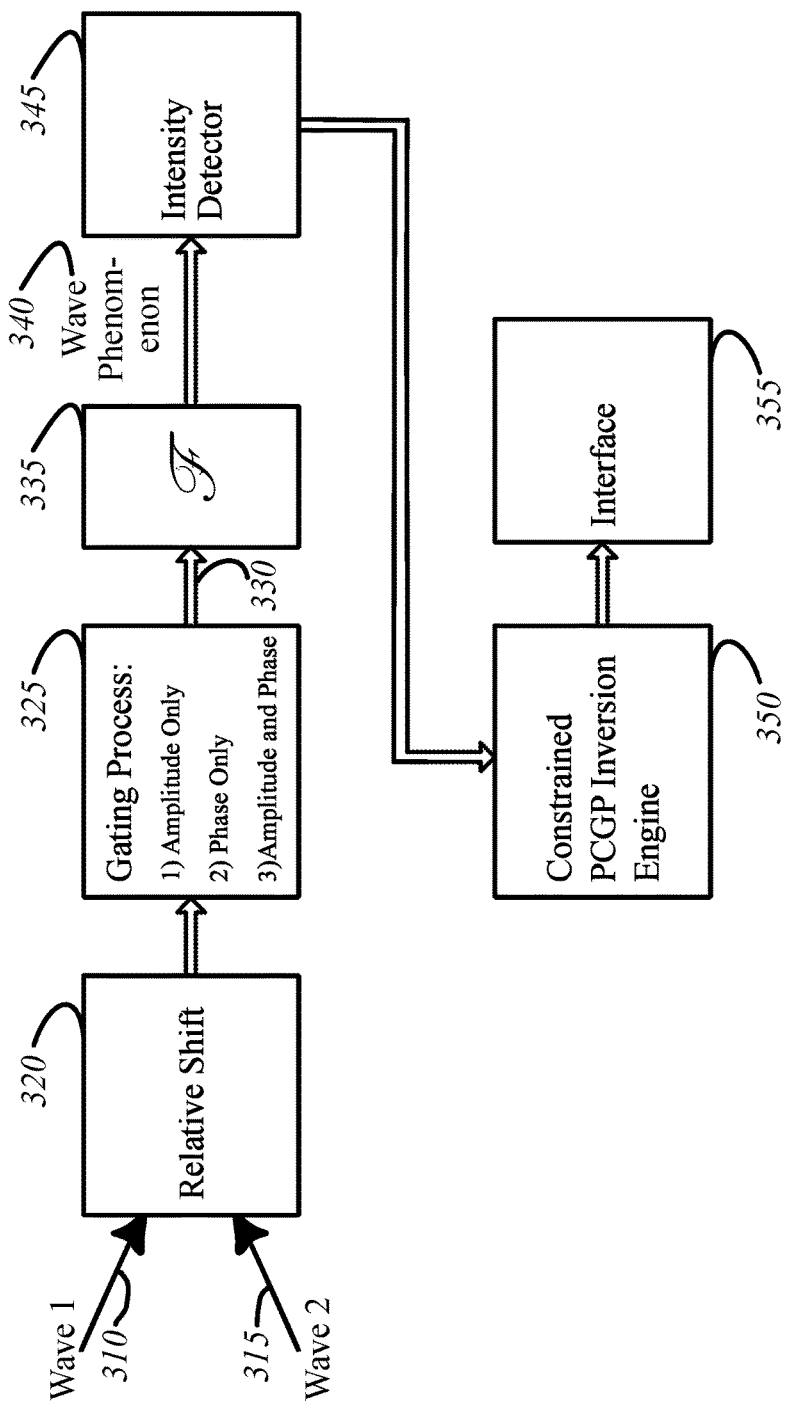
FIG. 4 is a schematic diagram showing a system that generates FROG data and analyzes the FROG data using the constrained outer product form of the C-PCGP apparatus.

FIG. 4 shows a preferred general architecture. Two waves 310, 315 are input to the FIG. 4 analysis system and the system applies a relative shift 320 between the two input waves 310, 315. The relative shift can be temporal, frequency, or spatial. One wave is used to gate the other 325, and a reversible transform 335 is applied to the gated output wave 330. Gate is used here in the same sense as discussed above. The gate can be either intensity or phase only or any combination of intensity and phase that is represented by, or is a function of, one of the waves. The reversible transform 335 is preferably a Fourier transform produced physically by a spectrometer or propagation as in the case of Fraunhofer diffraction. The reversible transform could also be Fresnel diffraction. A detector 345 obtains the intensity or absolute value (magnitude) of the wave phenomena 340. The wave phenomena are sent to the constrained PCGP inversion engine 350. The output of the inversion engine (wave characteristics) is sent to an interface 355 that could be a user interface or an interface to another process.

In the case of FROG CRAB, the attosecond XUV or X-ray pulse to be measured generates an electron wavepacket by photoionizing atoms. A femtosecond IR laser pulse can then phase modulate the electron wavepacket so that the IR laser pulse acts as a phase gate. The photoelectron spectrum is recorded as a function of time delay between the attosecond pulse and the femtosecond IR laser pulse. The resulting spectrogram obtained from the photoelectron spectrum is used as the spectrogram that is inverted using the PCGP algorithm. Because the femtosecond IR laser pulse can be characterized using standard FROG methods in a manner that is independent of the FROG CRAB system, the measured IR pulse, which directly represents the phase gate, could provide constraint information for a constrained PCGP system.

A phase gate is much easier to calibrate than an intensity gate, especially when used with phase modulators. While blind-FROG inversions can work to obtain the phase, the constrained PCGP system can provide more robust phase retrieval when phase modulation frequencies are low compared to temporal features in the wave to be measured.

These examples all measure wave phenomena produced by two or more waves. The wave phenomena provide the constraint, and the product (gating) is the interaction. The waves are represented as vectors or tensors for processing within the system. The wave phenomena can have a dimension of two or higher.

Nonlinear interactions are not required for multiplication or gating. Any process that effectively multiplies can gate. For example, electronically driven phase and/or intensity modulators can be used for the multiplication or gating process where the modulator acts on the other wave, which can be light or another electromagnetic wave. In this case, one wave is the phase and/or intensity imparted by the modulator and the other wave is the wave on which the modulator acts. Either wave can provide constraints or can be externally constrained.

If a process is amenable to modeling by an invertible transformation, then input vectors are optimizable, and controllable, by the application of the constrained PCGP.

Although the invention has been described in detail with particular reference to these preferred embodiments, other embodiments can achieve the same results. Variations and modifications of the present invention will be apparent to those skilled in the art. The present invention is not defined by the various embodiments described here but is instead defined by the claims, which follow.

What is claimed is:

1. A method for determining characteristics of an unknown ultrafast electromagnetic wave comprising:
   receiving trace data obtained by an acquisition system that received the unknown ultrafast electromagnetic wave as an input, the trace data comprising a set of intensity values as a function of a first variable and of delay, the received trace data stored in a memory of a processing system;
   generating, using at least one processor, a first wave pattern, generating a first outer product responsive to the first wave pattern and generating first synthetic trace data responsive to the first outer product;
   adjusting the first synthetic trace data using the set of intensity values for the received trace data to provide adjusted first synthetic trace data;
   generating a second wave pattern responsive to the first wave pattern and the adjusted first synthetic trace data;
   generating a constrained second wave pattern responsive to the second wave pattern and at least one constraint;
   generating second outer product and second synthetic trace data responsive to the constrained second wave pattern;
   retrieving, using the at least one processor, a phase characteristic of the unknown ultrafast electromagnetic wave responsive to the second synthetic trace data; and
   generating, using the at least one processor, a display of the phase characteristic.

2. The method according to claim 1, wherein the first variable is frequency and the received trace data is a frequency resolved optical gating (FROG) trace.

3. The method according to claim 1, wherein the first variable is frequency as determined by a spectrometer.

4. The method according to claim 1, wherein the at least one constraint is an internal constraint including a mathematical form constraint.

5. The method according to claim 4, wherein the first variable is frequency, the received trace data is a frequency resolved optical gating (FROG) trace and the mathematical form constraint corresponds to polarization gate FROG.

6. The method according to claim 4, wherein the mathematical form constraint corresponds to a second harmonic gate frequency resolved optical gating (FROG) configuration.

7. The method according to claim 1, wherein the at least one constraint is an external constraint.

8. The method according to claim 7, wherein the at least one constraint is a spectral constraint.

9. The method according to claim 1, the method further comprising, dividing the unknown ultrafast electromagnetic wave into a first electromagnetic wave and a second electromagnetic wave, the first and second electromagnetic waves comprising an ultrafast pulse;

generating a sequence of controlled relative delays between the first electromagnetic wave and the second electromagnetic wave, so that the second electromagnetic wave has a sequence of selected relative delays with respect to the first electromagnetic wave;

multiplying the first electromagnetic wave with the second electromagnetic wave for each of the sequence of selected relative delays to provide a corresponding sequence of output electromagnetic waves;

measuring, using an electronic detector coupled to a digital computer, an array of intensities for each of the sequence of output electromagnetic waves; and outputting the arrays of intensities for each of the sequence of output electromagnetic waves as the trace data.

10. The method according to claim 1, further comprising:

generating a third wave pattern using the at least one processor, the first synthetic trace data generated by at least one outer product between the first wave pattern and the third wave pattern.

* * * * *